(12) United States Patent
Treadwell et al.

(10) Patent No.: US 7,635,037 B2
(45) Date of Patent: Dec. 22, 2009

(54) MOTORIZED TOWING DEVICE

(75) Inventors: Simon Treadwell, Etobicoke (CA);
Alastair Jenkins, Etobicoke (CA)

(73) Assignee: 1498456 Ontario Inc., Toronto (CA)

( * ) Notice: Subject to any disclaimer, the term of this patent is extended or adjusted under 35 U.S.C. 154(b) by 134 days.

(21) Appl. No.: 10/577,384

(22) PCT Filed: Oct. 26, 2004

(86) PCT No.: PCT/CA2004/001875

§ 371 (c)(1),
(2), (4) Date: Apr. 27, 2006

(87) PCT Pub. No.: WO2005/039961

PCT Pub. Date: May 6, 2005

(65) Prior Publication Data

US 2007/0131461 A1    Jun. 14, 2007

(30) Foreign Application Priority Data

Oct. 27, 2003  (CA) .................................. 2447019

(51) Int. Cl.
*B62D 51/04* (2006.01)
(52) U.S. Cl. .................................. 180/19.3; 280/460.1
(58) Field of Classification Search .................. 180/11, 180/15, 16, 19.1, 19.3, 218, 65.1; 280/503, 280/47.131, 47.17, 47.24, 460.1
See application file for complete search history.

(56) References Cited

U.S. PATENT DOCUMENTS

| | | | | |
|---|---|---|---|---|
| 1,555,171 A | * | 9/1925 | Ulevog | 280/443 |
| 3,770,070 A | | 11/1973 | Smith | |
| 3,815,699 A | * | 6/1974 | Ganskopp et al. | 180/11 |
| 4,709,772 A | * | 12/1987 | Brunet | 180/8.2 |
| 5,109,938 A | * | 5/1992 | Vautelin et al. | 180/19.3 |
| 5,540,296 A | * | 7/1996 | Strothmann | 180/19.3 |
| 5,762,154 A | * | 6/1998 | Hsu | 180/15 |
| 5,913,373 A | * | 6/1999 | Forrest | 180/6.2 |
| 5,971,091 A | | 10/1999 | Kamen et al. | |
| 6,139,032 A | * | 10/2000 | Hartman | 280/32.7 |
| 6,435,535 B1 | | 8/2002 | Field et al. | |
| 6,540,238 B2 | * | 4/2003 | Yang | 280/32.7 |
| 6,758,291 B1 | * | 7/2004 | Koch | 180/11 |

(Continued)

FOREIGN PATENT DOCUMENTS

DE    199 47 426 A1    4/2001

(Continued)

OTHER PUBLICATIONS

PCT International Preliminary Report on Patentability (Form PCT/IB/373)—1 pg.

(Continued)

*Primary Examiner*—Tony H. Winner
(74) *Attorney, Agent, or Firm*—Fay Sharpe LLP

(57) ABSTRACT

A motorized towing device comprising a chassis, at least one motor, at least two wheels, a controller, and a quick release attachment mechanism. The controller operates the motor to cause the rotation of the wheels and the movement of the chassis over a surface. The quick release attachment mechanism releaseably secures the chassis to an object desired to be towed or moved while permitting rotational movement of the device relative to the object about a generally horizontal plane.

15 Claims, 10 Drawing Sheets

U.S. PATENT DOCUMENTS

| | | | |
|---|---|---|---|
| 6,964,425 B2 * | 11/2005 | Turner | 280/276 |
| 7,000,933 B2 * | 2/2006 | Arling et al. | 280/204 |
| 7,017,685 B2 * | 3/2006 | Schoenberg | 180/2.1 |
| 7,021,407 B2 * | 4/2006 | Ruschke et al. | 180/11 |

FOREIGN PATENT DOCUMENTS

| | | |
|---|---|---|
| FR | 2 801 028 A1 | 5/2001 |
| GB | 2 274 433 A | 7/1994 |
| GB | 2274433 | 7/1994 |
| WO | WO 0164502 | 9/2001 |
| WO | WO2004007264 | 1/2004 |
| WO | WO 2005009828 | 2/2005 |

OTHER PUBLICATIONS

Written Opinion of the International Searching Authority (Form PCT/ISA/237)—6 pgs.

* cited by examiner

MOTORIZED TOWING DEVICE

FIELD OF THE INVENTION

This invention relates to motorized towing devices, and in particular to a novel form of motorized towing device or tow-motor including a quick release attachment mechanism to allow the device to be readily attached to accessories, containers, trolleys and similar objects so as to permit such objects to be transported, towed or moved between locations.

BACKGROUND OF THE INVENTION

Traditionally where there has been a need or a desire to transport goods of a volume or mass that is of an impractical size to require the assistance of trucks or other heavy machinery, but large enough to make the goods difficult to carry manually, people have turned to the use of carts, dollies, trolleys, and similar mechanisms for assistance. Two of the more common of such devices are the standard wheelbarrow and shopping cart, both of which have been in widespread use for a considerable length of time. Prior known shopping carts include those that are described under U.S. Pat. Nos. 4,096,920; 4,771,840; 4,020,916; 4,750,578; and 5,064,012, and U.S. design patent Des 309,517.

Where the mass or volume of products or goods sought to be moved is significant, others have proposed the use of a self-propelled or powered cart to transport the goods from place to place. An example of such a powered cart or barrow is found in U.S. Pat. No. 2,918,133. Another example of a powered cart is described by U.S. Pat. No. 3,266,813 which concerns a mobile garden and refuge cart for safe and sanitary storage, clean-up and pick-up services. Other carts or transportation devices are described and discussed in U.S. Pat. Nos. 3,485,314; 3,791,470; 4,137,984; and, 4,203,609.

While the powered carts or transportation devices developed by others, including those described in the U.S. patents listed above, have proven useful to assist individuals in transporting materials from place to place, they suffer from the inherent limitation of being particularly adapted and designed for a single specific use only. For example, while a powered wheelbarrow, such as that described in U.S. Pat. No. 2,918,133, may be useful in transporting sand, bricks, or other materials on a construction site, it offers little assistance to an elderly person walking home with a significant volume of groceries. Similarly, a powered grocery shopping cart would be of little use on a construction site, to an individual wishing to transport bags of fertilizer or other supplies when engaged in gardening activities, or to someone moving luggage through an airport terminal. Existing "powered" carts or trolleys are designed with specific end uses in mind making it impractical, if not in many cases impossible, to adapt or utilize the devices for applications other than the particular purposes for which they were constructed. The size, weight and complexity of many such prior art devices also makes them uneconomical and/or impractical for use by consumers outside of industrial applications. In addition, currently available powered carts tend to operate at fixed speeds and are not accommodating to different individuals who may walk at different rates.

SUMMARY OF THE INVENTION

The invention therefore provides a new and unique motorized towing device that addresses many of the deficiencies of powered carts and barrows that are currently available. The towing device of the present invention permits an operator to quickly and easily attach the device to a wide range of accessory containers, carts or trolleys that facilitate the movement of large volumes or heavy loads of materials between locations, as the situation necessitates. The adaptability of the device and its application permits it to be used for the movement of goods over short or longer distances, in both indoor and outdoor environments, and in industrial or residential applications. In one embodiment the device is also adaptable to the walking speed of the individual operator.

Accordingly, in one of its aspects the invention provides a motorized towing device comprising a chassis, at least one motor, at least two wheels, a controller, and a quick release attachment mechanism, said controller operating said motor to cause the rotation of said wheels and the movement of said chassis over a surface, said quick release attachment mechanism releaseably securing said chassis to an object desired to be towed or moved while permitting rotational movement of said device relative to said object about a generally horizontal plane.

The invention also provides a motorized towing device comprising a chassis housing one or more reversible, variable speed, electric motors, said motors operatively connected to one or more axles, at least 2 wheels mounted upon said one or more axles; an electric battery to provide power to said one or more motors; a controller at least partially connected to a steering column attached to said chassis, said controller including switches to vary the amount of electrical energy distributed from said battery to said one or more motors; a quick release attachment mechanism to releaseably secure said chassis to an object desired to be towed or moved while permitting rotational movement of said object relative to said chassis in a generally horizontal plane; and, a secondary attachment mechanism to releasably secure said steering column to said object desired to be towed or moved.

In a further aspect the invention provides a motorized towing device comprising a chassis housing a pair of reversible direct current variable speed electric motors, each of said motors connected to an axle upon which is mounted a wheel; an electric battery to provide power to said motors; a controller at least partially connected to a steering column attached to said chassis, said controller including switches to vary the amount of electrical energy distributed from said battery to said motors in response to force applied to said steering column; and, a quick release attachment mechanism to releaseably secure said chassis to an object desired to be towed or moved while permitting rotational movement of said object relative to said chassis in a generally horizontal plane.

The invention also provides a motorized towing device comprising a chassis housing a pair of reversible current variable speed electric motors, each of said motors connected to an axle upon which is mounted a wheel; an electric battery to provide power to said motors; a controller at least partially positioned upon a steering column connected to said chassis, said controller including a microprocessor and switches that generate signals corresponding to force applied to said steering column by an operator of said device, said signals generated by said switches received by said microprocessor, said microprocessor controlling the speed and direction of rotation of said motors in response to the receipt of said signals causing said device to move at a speed and in the direct direction of the movement of an operator; and, a quick release attachment mechanism to releaseably secure said chassis to an object desired to be towed or moved.

In another aspect the invention concerns a motorized towing device comprising a chassis housing a pair of reversible variable speed direct current electric motors, each of said motors connected to an axle upon which is mounted a wheel;

an electric battery to provide power to said motors; a microprocessor control to govern the operation of said motors; a steering column connected to said chassis, said steering column including switches that upon operation generate signals received by said microprocessor control causing said microprocessor to operate said motors to turn said wheels in a manner that results in said device moving at a rate of speed and in the same general direction as an operator; and, a quick release attachment mechanism to releaseably secure said chassis to an object desired to be towed or moved while permitting rotational movement of said object relative to said chassis in a generally horizontal plane.

Further, the invention, in one aspect, provides a motorized towing device comprising a chassis housing a pair of reversible variable speed direct current electric motors, each of said motors connected to an axle upon which is mounted a wheel; an electric battery to provide power to said motors; a microprocessor control to govern the operation of said motors; a steering column connected to said chassis; switches that generate signals upon the application of a force to said steering column, said signals received by said microprocessor control and causing said microprocessor control to operate said motors so as to turn said wheels in a manner that results in said device moving at a rate of speed and in the direction of movement of an operator; and, a quick release attachment mechanism to releaseably secure said chassis to an object desired to be towed or moved, said quick release attachment mechanism comprising one or more yokes releaseably securable about the exterior of said chassis, said yokes comprising a stationary portion, a rotating portion and a closure or locking mechanism to secure said stationary portion to said rotating portion and to thereby secure said object desired to be towed or moved to said chassis while permitting rotational movement of said chassis relative to said object.

In an alternate aspect the invention concerns, in combination, a motorized towing device and a wheeled cart, said motorized towing device comprising a chassis housing a pair of reversible variable speed direct current electric motors, each of said motors connected to an axle upon which is mounted a wheel; a battery to provide power to said motors; a microprocessor control; a steering column connected to said chassis; one or more switches generating signals in response to force applied to said steering column by an operator, said signals received by said microprocessor control and causing said microprocessor control to operate said motors to rotate said wheels in a manner so as to move said chassis at a speed and in the general direction of the movement of said operator; and, a quick release attachment mechanism to releaseably secure said wheeled cart to said chassis, said quick release attachment mechanism comprising one or more yokes connected to said wheeled cart and releaseably receivable about said chassis, said one or more yokes including a stationary portion, a rotating portion, and a magnetic, electromagnetic or mechanical clamp, wherein the securement of said one or more yokes about said chassis through activation of said clamp releaseably secures said wheeled cart to said chassis permitting said chassis to tow or move said cart across a surface while permitting rotational movement of said one or more yokes relative to said chassis.

Further aspects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which.

DESCRIPTION OF THE PREFERRED EMBODIMENT

Figure 1:
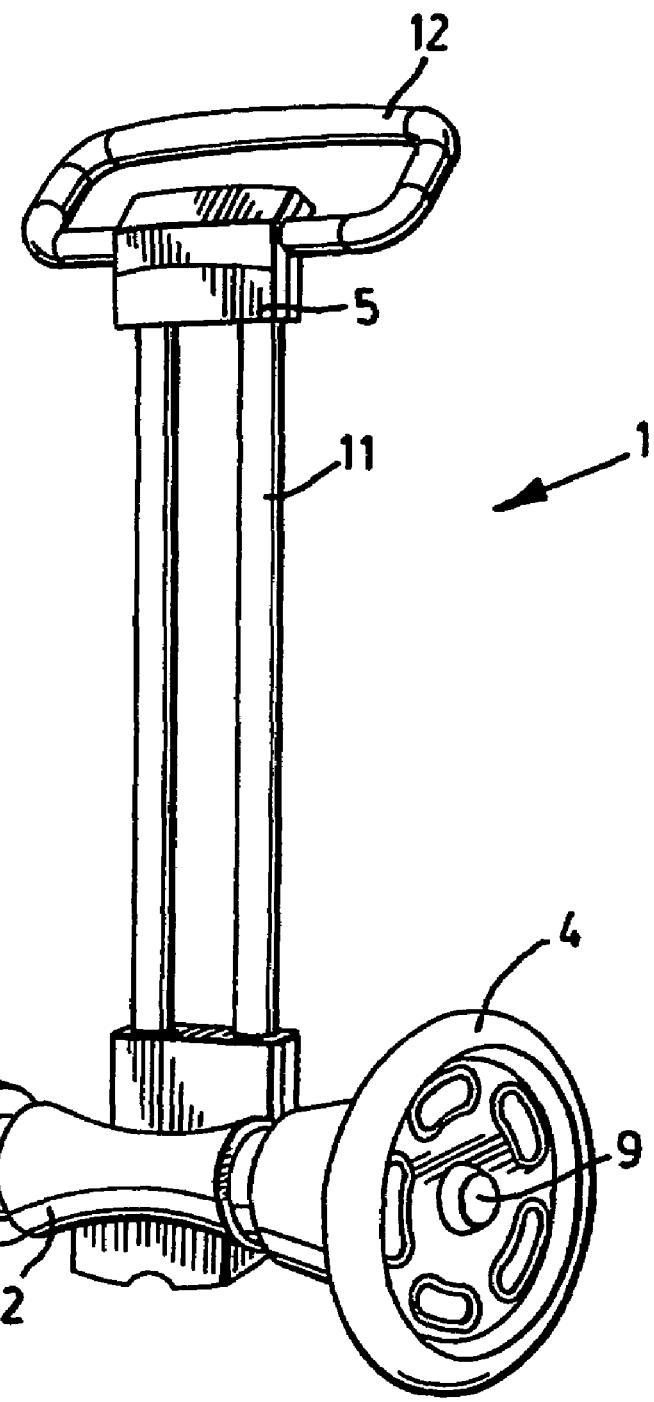
FIG. 1 is an upper front side perspective view of the motorized towing device in accordance with one of the preferred embodiments of the present invention.
Figure 2:
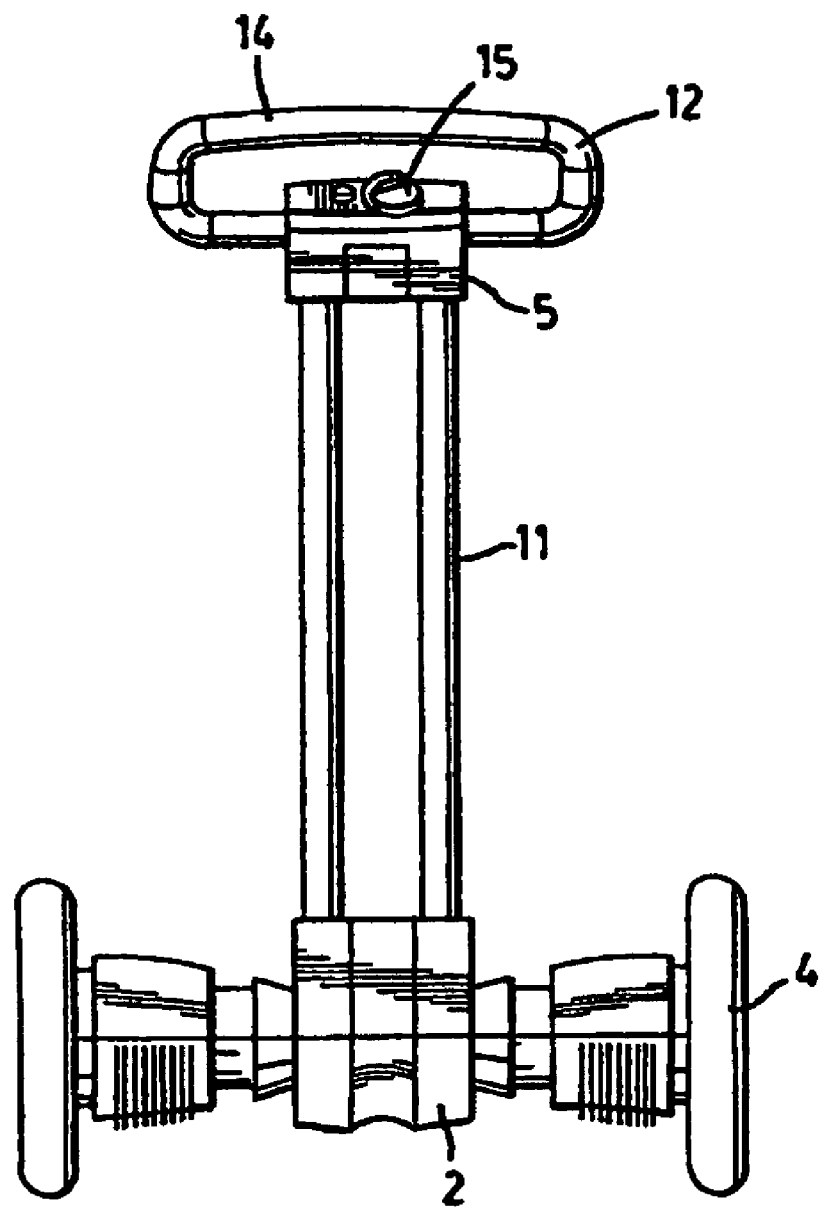
FIG. 2 is a rear elevational view of the device shown in FIG. 1.
Figure 3:
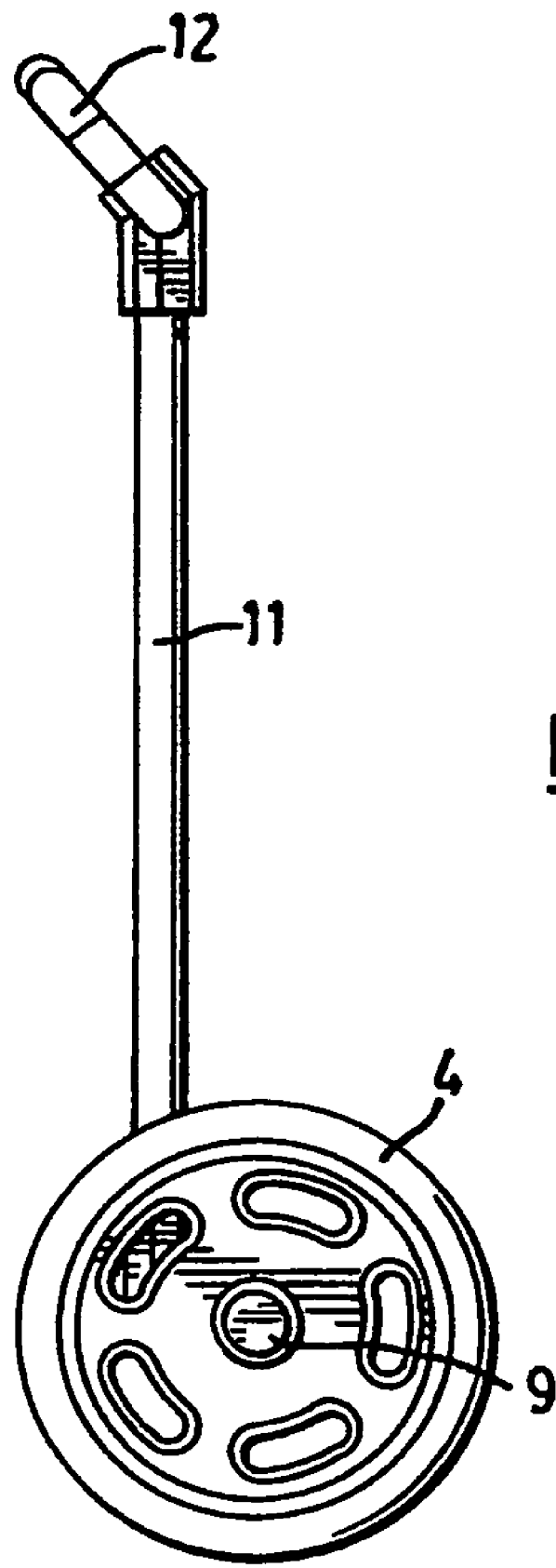
FIG. 3 is a side elevational view of the device shown in FIG. 1.
Figure 4:
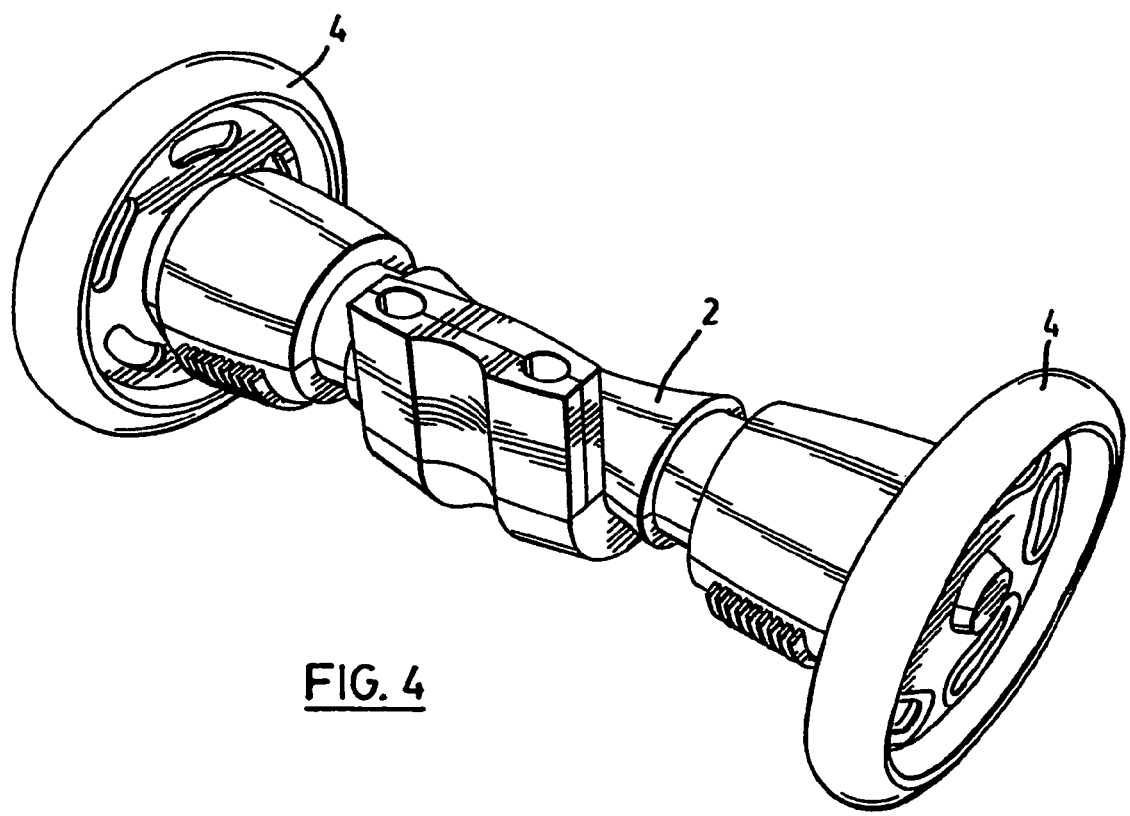
FIG. 4 is an upper rear perspective view of the motorized towing device shown in FIG. 1 having its steering column removed.
Figure 5:
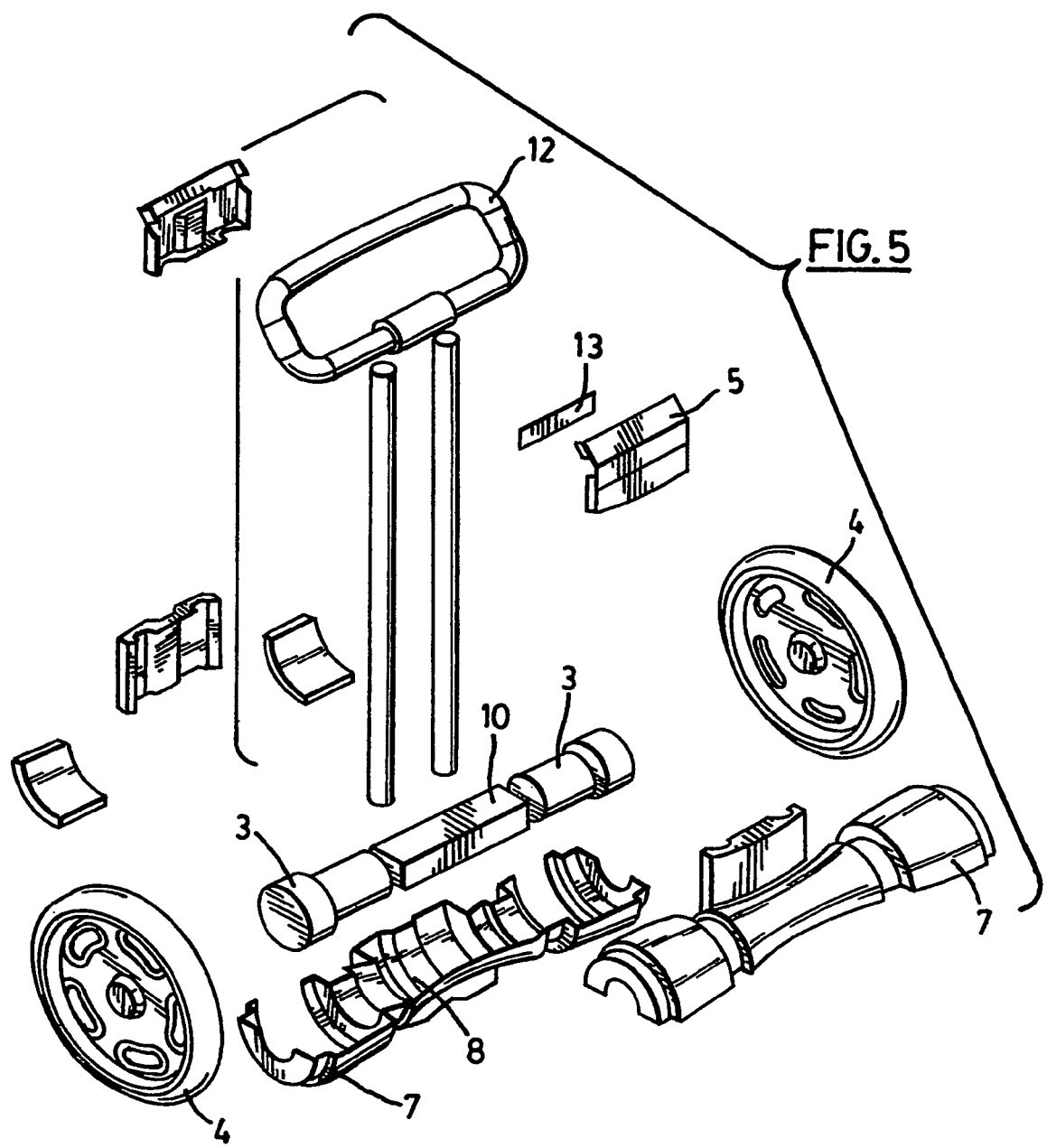
FIG. 5 is an exploded view of the motorized towing device of FIG. 1 showing a number of its component parts.

The present invention may be embodied in a number of different forms. However, the specification and drawings that follow describe and disclose only some of the specific forms of the invention and are not intended to limit the scope of the invention as defined in the claims that follow herein.

A motorized towing device constructed in accordance with a preferred embodiment of the present invention is shown in the attached drawings and noted by reference numeral 1. Device 1 is comprised, in general, of a chassis 2, at least one motor 3, at least two wheels 4, a controller 5 and a quick release attachment mechanism 6 to releaseably secure the device to an object to be towed or moved. While it will be appreciated from a full understanding of the invention that chassis 2 make take any one of a wide variety of different physical configurations, in the embodiment shown the chassis is generally cylindrical in configuration and would typically be formed from an outer housing 7 comprised of a number of component parts that when fastened together form an outer shell having a generally hollow interior 8. In the embodiment shown, the hollow interior 8 of the chassis houses a pair of motors 3 operatively connected to axles 9 upon which wheels 4 are mounted and positioned at opposite ends of the chassis. The motors are preferably reversible, direct current, variable speed electric motors and may be either connected directly to wheels 4 by means of axles 9, or may be connected to the axles through an intermediary gear or clutch mechanism. Motors 3 are preferably powered by a battery 10 which may be rechargeable permitting the battery to be recharged through connecting to a standard household electrical outlet. If desired, battery 10 may also be equipped so that it may be recharged through the use of an accessory outlet in a car, truck or other vehicle. Depending upon the desired end use of device 1, battery 10 may be of a varying size and capacity.

As shown in the attached drawings, motorized towing device 1 also preferably includes a steering column 11 connected to chassis 2. The steering column will typically incorporate a handle member 12 that provides a means by which an operator can grasp the device to move it from location to location. In some embodiments of the invention handle 12 may be fixed to the steering column while in other embodiments it may be rotationally attached thereto. In one preferred embodiment, at least a portion of controller 5 is mounted upon steering column 11.

Controller 5 is electrically connected to both battery 10 and motors 3 and includes a microprocessor to control the operation of the motors and to vary the speed and direction of their rotation, independent of each other. That is, the controller and its microprocessor permit the rotation of each wheel to be controlled independently in terms of both direction of rotation and speed, to provide for a maximum degree of flexibility during operation of device 1. For example, when maneuvering in extremely tight quarters it may be desirable for one motor to be engaged in a forward direction and one motor to be engaged in a reverse direction so as to effectively spin device 1 on its own vertical axis. Alternately, where motorized towing device 1 is being moved in a forward or reverse direction and it is desired to negotiate a turn, preferably the wheel on the outside radius of the turn is operated at a faster rate than the inside wheel to permit a smooth negotiation of the turn without causing the outer wheel to "jump".

The operation of controller 5 and its internal microprocessor may be accomplished through the use of pressure sensitive switches (which may be in the form of an electronic module containing field effect transistors or similar devices) that permit the distribution of electrical power from battery 10 to motors 3 in response to the magnitude of the force applied to the switches. Accordingly, through the use of variable speed electric motors, and with the assistance of software programmed into the microprocessor, the application of varying amounts of force to pressure sensitive switches 13 will cause motors 3 to drive wheels 4 at varying rates of speed and in a desired rotational direction.

Depending upon the particular application of device 1, the location and operation of pressure sensitive switches 13 that control the operation of motors 3 may vary. For example, in one instance switches 13 may be located within gripping portion 14 of handle 12 such that squeezing the handle effectively directs electricity from the battery to the motors. An increase in the amount of compressive force will in this embodiment cause the motors to be run at a faster rate. Alternately, handle 12 may be rotatably mounted upon steering column 11 such that displacement of the handle in an upward or downward direction causes the application of force to pressure sensitive switches 13, resulting in the operation of motors 3. The continued rotational movement of the handle in either an upward or downward direction will increase the amount of force applied to the switches, and as a result increase the speed at which the motors are operated. In such an embodiment handle 12 is preferably biased to its rest position such that the release of the handle disengages the switches, interrupts the power supply to the motors, and causes device 1 to stop.

Pressure sensitive or similar switches may also be included within the handle and steering column mechanism to react to the torsional or pivotal force applied to the handle relative to the longitudinal axis of the steering column, such as would be the case where an individual holding the steering column wishes to turn in a left or right direction. In such an instance signals generated by switches 13, and corresponding to the torsional or pivotal force applied to handle 12, will be sent to the microprocessor control. The microprocessor then analyzes those signals and determines the speed at which each of the two motors must be rotated in order to negotiate the movement (in this instance the turn) desired by the operator.

It will be appreciated that what has been described is effectively a force actuated steering and control system that permits the microprocessor control to operate each motor 11 independently from each other in order to accommodate the motions and movement of an operator of motorized towing device 1. A number of pressure sensitive or similar switches may be used to maximize the control of towing device 1. As described above, such switches may be incorporated within either handle 12 or steering column 11 and may allow the device to move forward at varying speeds upon the rotational movement of the handle in either an upward or downward direction or merely upon the application of a compressive force to the gripping portion of the handle. Where rotating the handle downwardly from its rest position causes the towing device to move forward, rotating the handle in the upward direction from its resting point will preferably engage the motors to cause motorized towing device 1 to move in a backward direction. Similarly, a torsional or pivotal force applied to the handle member (as will be the case when an individual negotiates a turn) will send signals to the microprocessor control to vary the amount of electricity sent to each individual motor in such a way to permit towing device 1 to turn in the direction of the movement of its operator.

In an alternate embodiment to the one described above, pressure sensitive switches 13 may be operatively connected to the lower portion of steering column 11 such that the signals generated and sent to the microprocessor control for purposes of operating motors 3 result from force applied directly to the steering column and not handle 12.

It should also be appreciated that operation of towing device 1 may be accomplished through the use of pressure sensitive switches or connected to both handle 12 and steering column 11. Common to all of the above embodiments, is the control of the direction and speed of movement of motorized towing device 1 through a force actuated steering and control mechanism that is operated by an individual through grasping, rotating, pulling and/or twisting either handle 12 and/or steering column 11. It should also be noted that the microprocessor control may be programmed to effectively use motors 3 for purposes of dynamic braking to slow, retard or stop the movement of the device when the application of force to the handle or steering column is removed.

The handle or steering column may further include a display panel 15 and one or more switches that affect the operation of device 1. The display panel may be one of any wide variety of commonly used panels that display either analog or digital information relating to items such as the speed of operation of the unit, the percentage of charge left in the battery, battery life expectancy in terms of time at a current rate of operation, etc. In addition, the display panel may contain indicator arrows to assist the operator in controlling device 1 and may include a switch or other means to turn the device off or to switch between programs stored in the microprocessor control to accommodate different applications. In these regards the device may effectively have a high and low range control that can be chosen depending upon the particular conditions on hand. For example, if motorized towing device 1 is to be used on a hard surface such as a sidewalk, a high range control may be activated permitting the motors to be operated at a relatively low level of torque and a somewhat high rate of speed. Alternately, in a situation where the device is to be used on a construction site and traversing a muddy or uneven ground surface, a low range control may be activated causing the motors to rotate at a lower rate of speed but a higher level of torque. In such cases, it may also be desirable to incorporate within the device variable torque motors, high range/low range gears systems or a plurality of motors operatively connected to each wheel wherein particular motors are engaged or disengaged as necessary in order to increase the amount of torque applied to an individual wheel under any particular circumstances. It may also be desirable to equip the motorized towing device with alternate sets of wheels or a track drive that can be interchanged as operational considerations and situations dictate.

Figure 6:
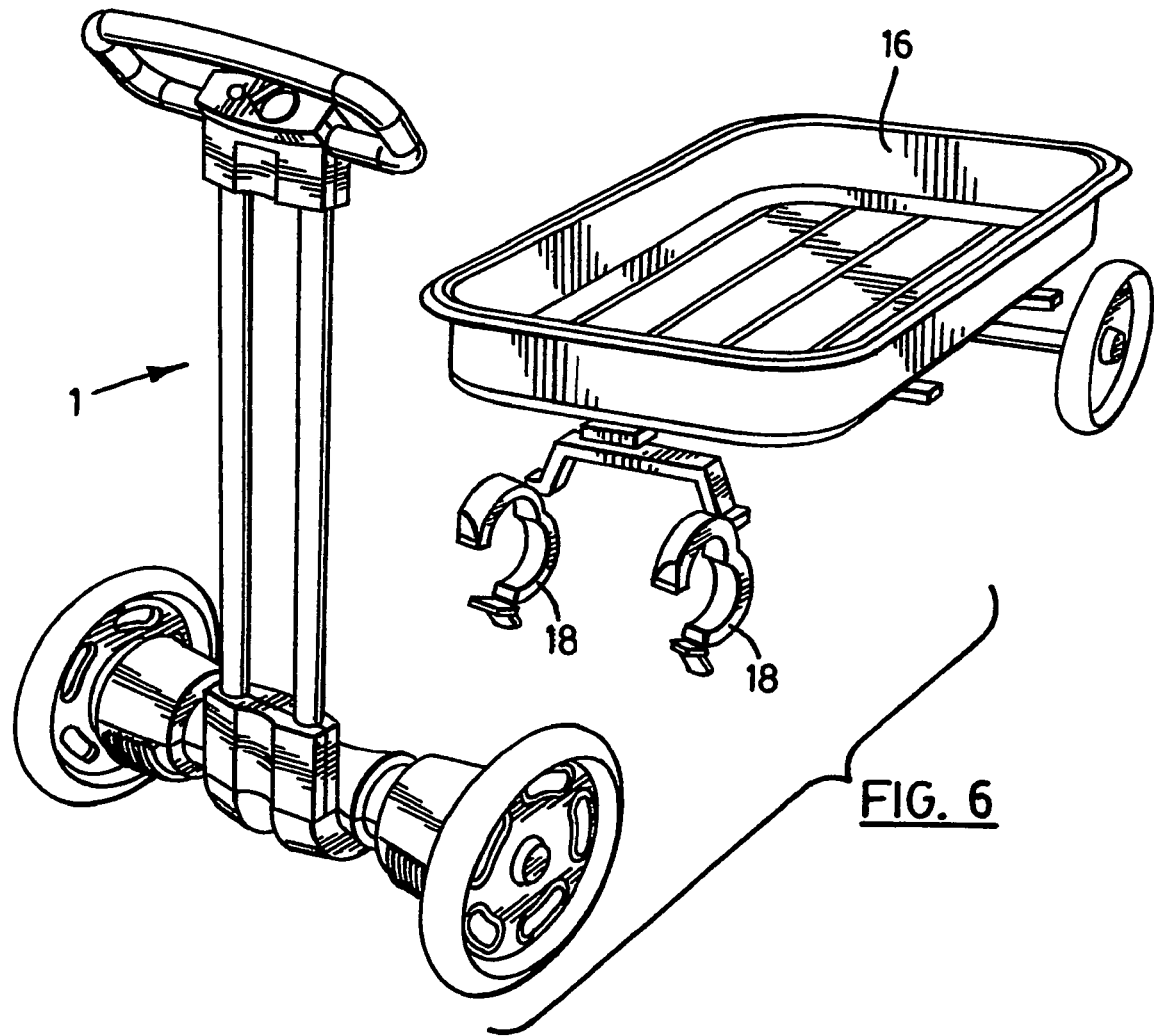
FIG. 6 is a perspective view of the motorized towing device in accordance with one of the preferred embodiments of the invention used in association with a wagon or wheeled container.
Figure 7:
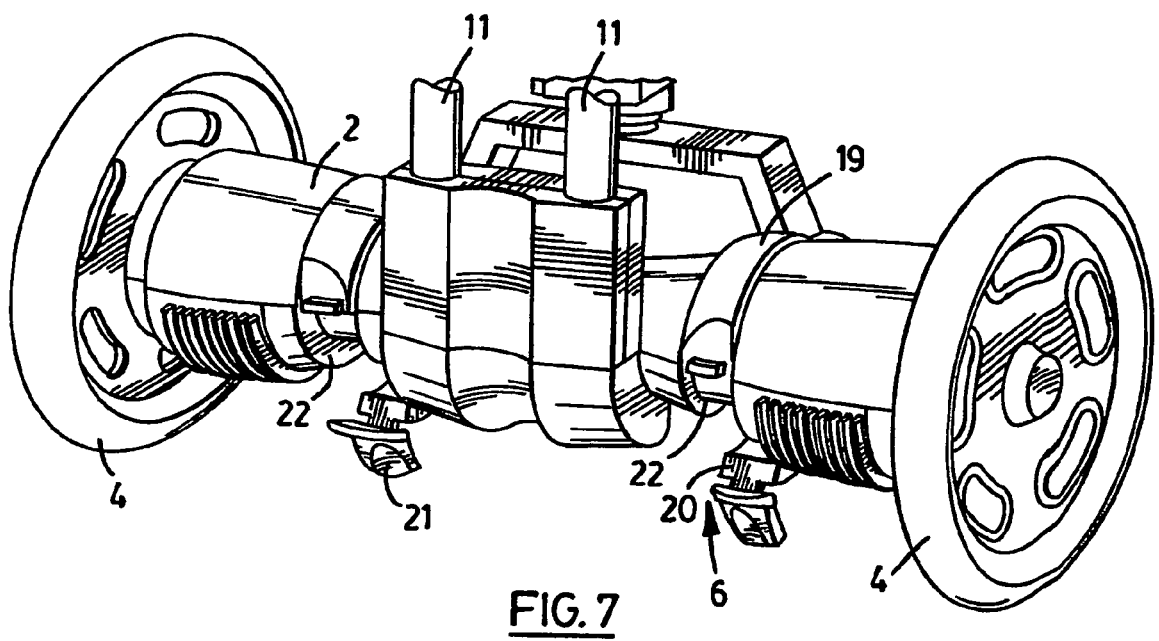
FIG. 7 is an enlarged detail view of the attachment of the wagon or wheeled container of FIG. 6 to the motorized towing device of FIG. 1, with its releaseable attachment mechanism is a disengaged configuration.
Figure 8:
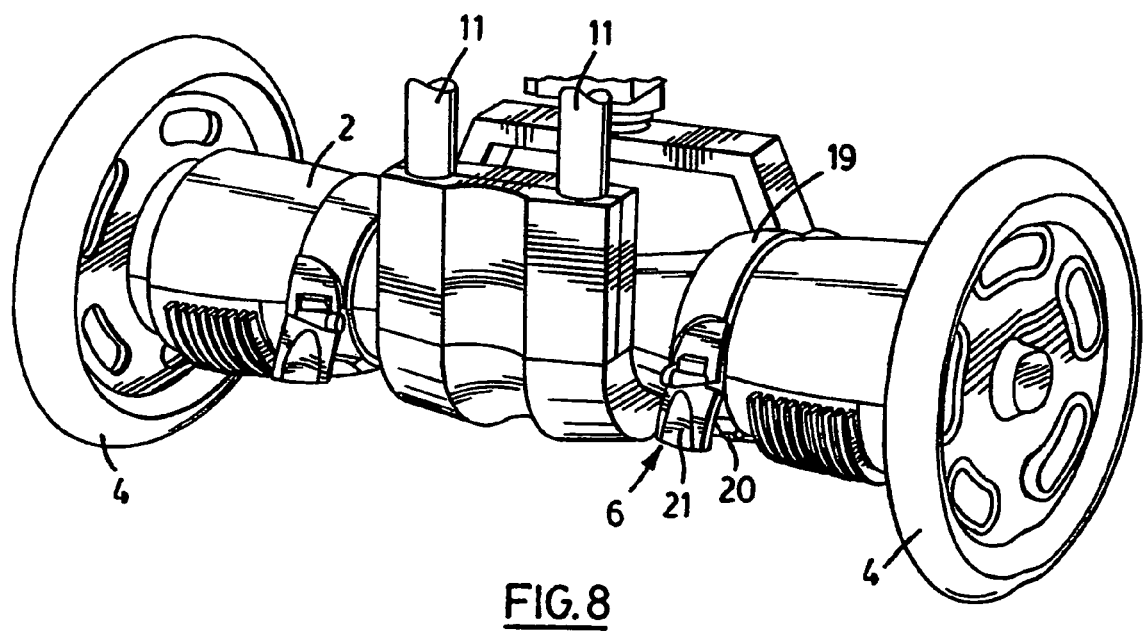
FIG. 8 is an enlarged detail view of the device shown in FIG. 7 with its releaseable attachment mechanism in a partially engaged configuration.
Figure 9:
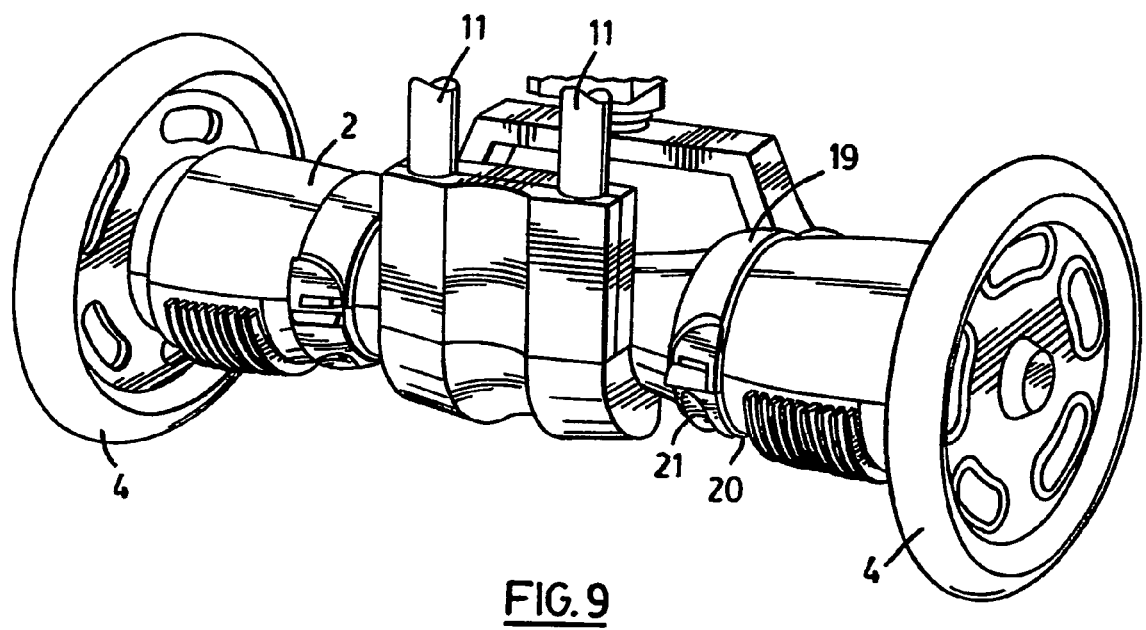
FIG. 9 is an enlarged detail view of the device shown in FIG. 8 with its releaseable attachment mechanism in a fully engaged configuration; and, FIG. 10 is a perspective view of the motorized towing device in accordance with one of the preferred embodiments of the invention used in association with a shopping cart.
Figure 10:
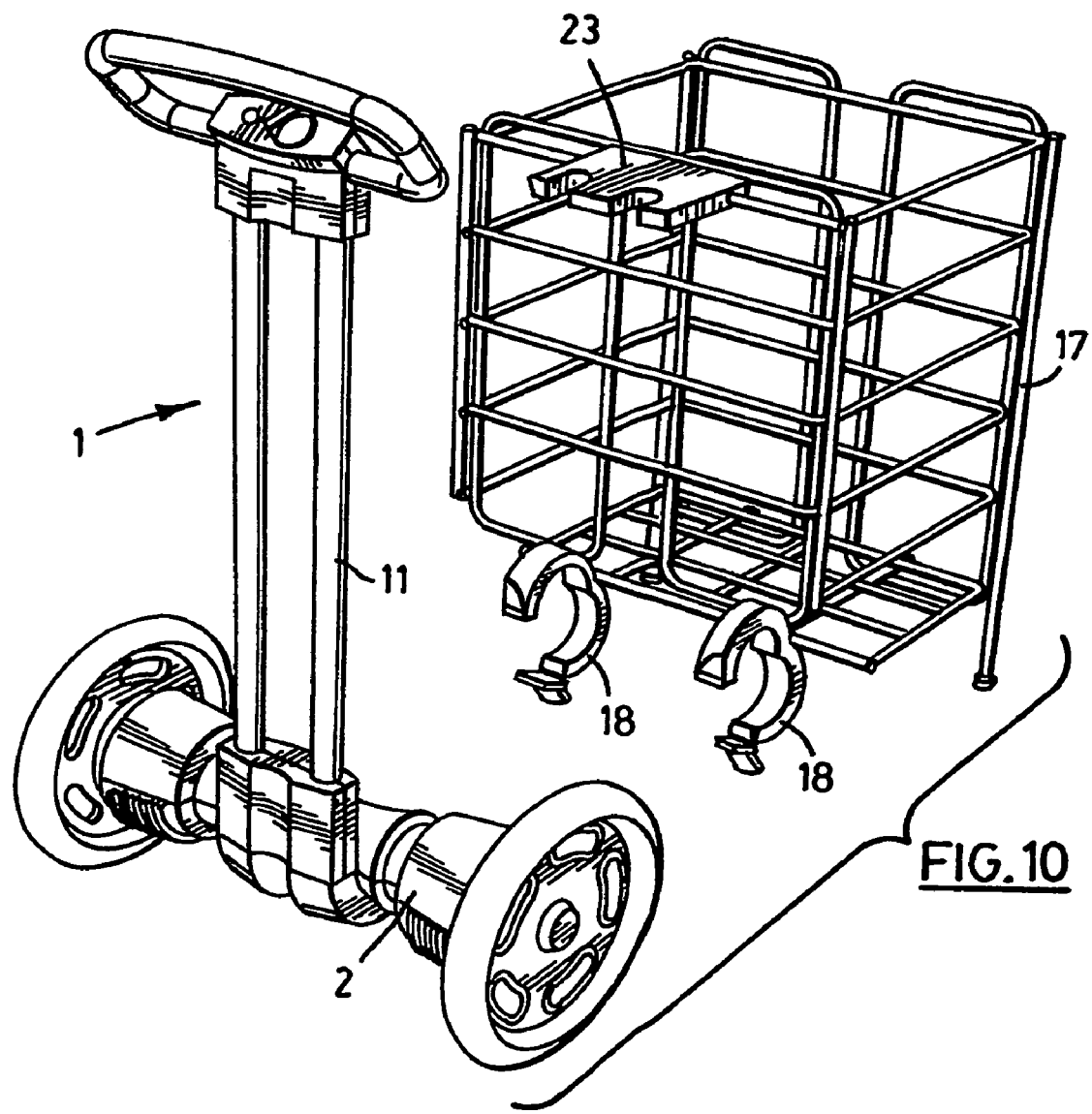

As indicated previously, motorized towing device 1 includes a quick release attachment mechanism 6 to releaseably secure chassis 2 to an object desired to be towed or moved. The object to be towed or moved may take any one of a very wide variety of different forms and structures from a wheeled cart or wagon 16 (as shown in FIG. 6) to a grocery or shopping cart 17 (as shown in FIG. 10), to a skid or runner mounted container, trolley or cart. In one of the preferred embodiments of the invention quick release attachment mechanism 6 comprises one or more yokes 18 releaseably securable about the exterior of chassis 2. With reference to FIGS. 6 through 9, yokes 18 generally comprise a stationary portion 19, a rotating portion 20, and a closure or locking mechanism 21. The closure or locking mechanism may be a magnetic, electromagnetic or mechanical clamp. In the embodiments shown, closure or locking mechanism 21 is comprised of a buckle-type closure.

In the majority of applications for motorized towing device 1 it is expected that the object to be towed or moved will be some form of wheeled wagon, trailer, container or vehicle. In such cases it is preferable to maximize the ease by which an individual is able to operate the device by permitting relative rotational movement between device 1 and the object to be towed, in a horizontal plane. That is, it is desirable to permit rotational movement of yokes 18 relative to chassis 2 generally along the horizontal axis of the chassis. In this manner with the wheeled cart, wagon or other object attached to chassis 2 will be free to move in a different horizontal place from that of device 1. Operation of motors 3 will therefore permit towing device 1 to move the wheeled wagon in a forward or reverse direction while at the same time the quick release attachment mechanism will permit rotational movement of chassis 2 relative to the object that is being towed. In this manner the angle at which steering column 11 is held by an operator can be varied without affecting the function of the device or the connection of the device to the object. For example, a tall individual may grasp handle 12 in such a manner that when walking in a forward direction steering column 11 is held in a substantially vertical orientation. The same motorized towing device pulling the same cart or object may be operated by an individual of considerable shorter stature in which case the steering column will be held at a much shallower angle. The ability of chassis 2 to rotate in a generally horizontal plane relative to the object being towed makes towing device 1 considerably more ergonomic for use by individuals of different heights. In addition, the ability of the chassis to rotate independently may in some instances facilitate a negotiation of uneven terrain, or enhance the ability of the device to travel over bumps, curbs, etc.

While it will be appreciated that there will be numerous different configurations for the design of quick release attachment mechanism 6 in a manner that allows chassis 2 to be rotatable relative to the object being towed, in the embodiment shown in the attached drawings the quick release attachment mechanism comprises a pair of yokes 18 that are releaseably secured around a pair of circumferential channels 22 upon the exterior surface of chassis 2. When received about channels 22, the rotating portion 20 of yokes 18 may be secured to a stationary portion 19 of the yokes by operation of locking or closure mechanism 21 (which in the embodiment shown in the attached drawings is a buckle-type lock). Thereafter, the yokes (and the device to which they are attached) will be securely connected to motorized towing device, 1 while still permitting the chassis to rotate independently of yokes 18.

As indicated, FIG. 10 shows an embodiment of the motorized towing device of the present invention for use in association with a shopping cart 17. In this embodiment quick release attachment mechanism 6 is once again comprised of a pair of yokes 18. However, in cases where the shopping cart does not have wheels (as in the embodiment shown in FIG. 10) there is preferably also utilized a secondary attachment mechanism 23 that releasably secures the upper portion of the cart to steering column 11. When engaging the steering column, secondary attachment mechanism 23 will prevent rotation of yokes 18 about chassis 2 to enable the shopping cart to be effectively lifted off the ground by grasping and rotating the steering column handle. That is, through the use of secondary attachment mechanism 23, device 1 permits objects to be either carried (as in the case of the shopping cart in FIG. 10) or trailed (as in the case of the wagon in FIG. 6) as desired. One or more secondary attachment mechanisms may be utilized and they may vary in structure from yokes that function in a similar fashion to yokes 18, to hook and loop fasteners, to threaded bolts, to friction clamps, to magnetic clamps, to buckles, or any one of a variety of other commonly used releasable clamping members.

It will be appreciated from a thorough understanding of the invention that the motorized towing device described herein provides an electric mode of source power to a wide range of containers, dollies, trolleys and other such devices through a modular tow motor with an electronic control that attaches, and provides assistive motive power, to such accessories with the assistance of a quick release attachment mechanism that enhances the ergonomics of the device. The towing device may be readily attached to an extremely wide variety of different objects depending upon the desired end use. The device may also be readily adapted for indoor and outdoor applications, and for a wide range of different terrains, including sidewalks and hard surfaces, as well as snowy, muddy or sandy conditions. The force actuated steering and control system as described in association with one of the preferred embodiments of the invention provides a manner of controlling the movement of the device's wheels to permit the towing device to move in a manner according to the speed and directional movement of the operator. Such a control mechanism further enhances the interface between the operator and the machine and the overall ergonomics of the invention. Further, the ability for the chassis of the towing device to rotate in a generally horizontal plane, independently from the object being towed, further enhances the device's ergonomics by helping to facilitate its use by individuals of varying height.

It is to be understood that what has been described are the preferred embodiments of the invention and that it may be possible to make variations to these embodiments while staying within the broad scope of the invention. Some of these variations have been discussed while others will be readily apparent to those skilled in the art. For example, while in the embodiment of the invention described above control is assisted through the use of pressure sensitive switches, it will be appreciated that in an alternate embodiment control may be affected by a displacement sensitive switching mechanism or by limit switches that generate signals in response to movement or force applied to handle 12 and/or steering column 11.

We claim:

1. In combination, a motorized towing device and a wheeled cart, said motorized towing device comprising: a chassis housing a pair of reversible variable speed direct current electric motors, each of said motors connected to an axle upon which is mounted a wheel; a battery to provide power to said motors; a microprocessor control; a steering column connected to said chassis; and, one or more switches generating signals in response to force applied to said steering column by an operator, said signals received by said microprocessor control and causing said microprocessor control to operate said motors to rotate said wheels in a manner so as to move said chassis at a speed and in the general direction of the movement of said operator; and, a quick release attachment mechanism to releasably secure said wheeled cart to said chassis, said quick release attachment mechanism comprising one or more yokes connected to said wheeled cart and releasably receivable about said chassis, said one or more yokes including a stationary portion, a rotating portion, and a clamp, wherein the securement of said one or more yokes about said chassis through activation of said clamp releasably secures said wheeled cart to said chassis permitting said chassis to tow or move said cart across a surface while permitting rotational movement of said one or more yokes relative to said chassis.

2. A towing device for providing assistive motive power to an operator while walking, said towing device comprising:
a pair of wheels;
a chassis housing at least one motor for causing the rotation of said wheels about an axis to move the chassis over a surface;
a controller for controlling operation of said at least one motor and thereby controlling movement of the chassis over the surface;
a steering column connected to said chassis for steering said towing device;
a quick release attachment mechanism on said chassis for cooperating with a corresponding attachment mechanism of an associated object for towing, the quick release attachment mechanism operating about an axis of rotation of said wheels to permit rotational movement of said motorized towing device relative to said objects, about said axis;
wherein said controller includes switches for varying the amount of electrical energy distributed to said at least one motor, said switches generating signals corresponding to force applied to said steering column during operation of said device, the signals being received by said controller for controlling the speed and direction of rotation of said at least one motor.

3. The motorized towing device according to claim 2, wherein said chassis houses a pair of motors, each of said motors connected to an axle upon which said wheels are mounted.

4. The motorized towing device according to claim 2, wherein each of said at least one motor is a reversible direct current variable speed electric motor.

5. The motorized towing device according to claim 2, further comprising a re-chargeable electric battery for providing power to said at least one motor.

6. The motorized towing device according to claim 2, wherein at least a portion of said controller is mounted on said steering column.

7. The motorized towing device according to claim 2, in combination with said associated object.

8. The motorized towing device according to claim 2, wherein said associated object comprises a wagon or wheeled cart.

9. The motorized towing device according to claim 2, further comprising a secondary attachment mechanism for releasable securing said steering column to said associated object.

10. The motorized towing device according to claim 2, wherein said switches vary the amount of electrical energy distributed from said battery to said motors.

11. The motorized towing device according to claim 2, wherein said controller comprises a microprocessor that controls the operation of said motors and which varies the speed and direction of rotation of each motor independent from the other to alter the forward and rearward direction and speed of movement of said device over a surface.

12. The motorized towing device according to claim 2, wherein said quick release attachment mechanism comprises at least one yoke releasably securable about an exterior of said chassis.

13. The motorized towing device according to claim 12, wherein said yoke comprises a stationary portion, a rotating portion and a closure mechanism for securing said upper portion to said rotation portion while permitting rotational movement of said yokes relative to said chassis.

14. The motorized towing device according to claim 13, wherein said closure mechanism comprises at least one of a magnetic, electromagnetic and a mechanical clamp.

15. The motorized towing device according to claim 2, wherein in response to signals received from said switches, said microprocessor operates said at least one motor as a dynamic brake to slow movement of said device.

* * * * *